United States Patent
Currey

(10) Patent No.: US 9,148,537 B1
(45) Date of Patent: Sep. 29, 2015

(54) FACIAL CUES AS COMMANDS

(75) Inventor: Robert W. Currey, Redding, CA (US)

(73) Assignee: hopTo Inc., Campbell, CA (US)

( * ) Notice: Subject to any disclaimer, the term of this patent is extended or adjusted under 35 U.S.C. 154(b) by 0 days.

(21) Appl. No.: 13/475,926

(22) Filed: May 18, 2012

(51) Int. Cl.
| | |
|---|---|
| H04N 1/00 | (2006.01) |
| H04N 5/232 | (2006.01) |
| H04N 5/262 | (2006.01) |
| H04N 5/228 | (2006.01) |
| G06K 9/00 | (2006.01) |
| G05B 19/00 | (2006.01) |

(52) U.S. Cl.
CPC ....... *H04N 1/00458* (2013.01); *H04N 5/23293* (2013.01)

(58) Field of Classification Search
CPC ....... H04N 5/222; H04N 5/262; H04N 5/228; H04N 5/239; G06K 9/00; G03B 17/00; G05B 5/00; G05B 19/00; G06F 3/033
USPC ........ 348/222.1, 78, 211.99, 211.4, 239, 348/333.01–333.12, 333.03; 382/115, 117, 382/118; 345/156; 715/863; 340/5.52, 5.82, 340/5.83, 5.53; 396/151, 121, 147, 51
See application file for complete search history.

(56) References Cited

U.S. PATENT DOCUMENTS

| | | | | |
|---|---|---|---|---|
| 5,623,703 | A * | 4/1997 | Takagi et al. | 396/51 |
| 5,850,211 | A * | 12/1998 | Tognazzini | 345/158 |
| 6,033,072 | A * | 3/2000 | Ono et al. | 351/208 |
| 6,205,508 | B1 | 3/2001 | Bailey et al. | |
| 6,421,064 | B1 * | 7/2002 | Lemelson et al. | 345/688 |
| 6,525,716 | B1 | 2/2003 | Makino | |
| 6,615,252 | B1 | 9/2003 | Oka et al. | |
| 6,677,969 | B1 * | 1/2004 | Hongo | 715/863 |
| 8,738,814 | B1 | 5/2014 | Cronin | |
| 8,745,280 | B1 | 6/2014 | Cronin | |
| 8,892,782 | B1 | 11/2014 | Cronin | |
| 2003/0038754 | A1 * | 2/2003 | Goldstein et al. | 345/7 |
| 2005/0147301 | A1 | 7/2005 | Wang et al. | |
| 2005/0200806 | A1 * | 9/2005 | Knaan et al. | 351/169 |
| 2008/0267447 | A1 * | 10/2008 | Kelusky et al. | 382/100 |
| 2009/0013092 | A1 | 1/2009 | Pao et al. | |
| 2009/0060291 | A1 * | 3/2009 | Ohtani et al. | 382/118 |
| 2010/0073497 | A1 * | 3/2010 | Katsumata et al. | 348/211.99 |
| 2010/0156781 | A1 * | 6/2010 | Fahn | 345/156 |
| 2010/0269039 | A1 | 10/2010 | Pahlavan et al. | |
| 2011/0019874 | A1 * | 1/2011 | Jarvenpaa et al. | 382/103 |
| 2011/0047231 | A1 | 2/2011 | Lim et al. | |
| 2011/0134033 | A1 | 6/2011 | Raynor | |
| 2011/0249868 | A1 * | 10/2011 | Tsukizawa et al. | 382/103 |

(Continued)

OTHER PUBLICATIONS

U.S. Appl. No. 13/481,748, filed May 25, 2012, John Cronin, System for and Method of Translating Motion-Based User Input Between a Client Device and an Application Host Computer.

(Continued)

*Primary Examiner* — Lin Ye
*Assistant Examiner* — Marly Camargo
(74) *Attorney, Agent, or Firm* — Lewis Roca Rothgerber LLP

(57) ABSTRACT

Information regarding facial cues may be received. Such information may associated each facial cue with a responsive action. Images (e.g., photo, video) of an area in front of a computing device may be captured by a front-facing camera. A user's face may be detected, as well as determined to exhibit a facial cue. The facial cue is identified, along with its associated action. The computing device may then perform the action associated with the facial cue exhibited by the user.

20 Claims, 3 Drawing Sheets

(56) References Cited

U.S. PATENT DOCUMENTS

| | | |
|---|---|---|
| 2011/0314093 A1 | 12/2011 | Sheu et al. |
| 2012/0019522 A1 | 1/2012 | Lawrence et al. |
| 2012/0089921 A1 | 4/2012 | Bellini |
| 2012/0256967 A1* | 10/2012 | Baldwin et al. ............... 345/684 |
| 2012/0293406 A1* | 11/2012 | Park et al. .................... 345/156 |

OTHER PUBLICATIONS

U.S. Appl. No. 13/481,749, filed May 25, 2012, John Cronin, System for and Method of Translating Motion-Based User Input Between a Client Device and an Application Host Computer.

U.S. Appl. No. 13/481,750, John Cronin, System for and Method of Translating Motion-Based User Input Between a Client Device and an Application Host Computer.

U.S. Appl. No. 13/481,748 Office Action mailed Sep. 9, 2013.

U.S. Appl. No. 13/481,749 Office Action mailed Aug. 28, 2013.

U.S. Appl. No. 13/481,750 Office Action mailed Aug. 28, 2013.

U.S. Appl. No. 13/481,748 Final Office Action mailed Mar. 26, 2014.

U.S. Appl. No. 13/481,748 Office Action mailed Jan. 16, 2015.

U.S. Appl. No. 14/248,505, filed Apr. 9, 2014, John Cronin, System for and Method of Translating Motion-Based User Input Between a Client Device and Application Host Computer.

* cited by examiner

FACIAL CUES AS COMMANDS

BACKGROUND

1. Field of the Invention

The present invention generally relates to computing commands. More specifically, the present invention relates to using facial cues as computing commands.

2. Description of the Related Art

Individuals currently have a variety of options for communicating and carrying out transactions. Such options may include traditional desktop coming devices, as well as various mobile devices (e.g., mobile phones, smartphones, tablets). In fact, many individuals may use multiple computing and mobile devices at home, work, and on the move. For example, an individual may use a desktop computer at work, a laptop computer at home, and one or more mobile devices (e.g., smartphone, tablet) elsewhere. In many cases, such computing devices may include a front-facing camera. Such a camera may generally be used for videoconferencing or taking self-portraits.

Various computing devices may not all have the same capabilities in other respects. For example, such devices may run different operating systems/platforms and applications. In addition, such devices may also be used differently, so applications may be optimized for one type of device, but not another. For example, the different devices may have different sizes and input options (e.g., keyboard, keypad, touchscreen). The display of one device may not be optimized for a second device. For example, if a desktop computer display is shrunk to fit on a smartphone screen, the shrunken size may be difficult for the user to read or discern what is being displayed. Alternatively, if the display is not shrunken, the smartphone may only be able to display a portion of the original display at a time, which also adds to the difficulty in reading and discerning what is being displayed. While some devices allow for manual adjustment of the display by the user, changing displays and images may require the user to continually re-adjust the display, which may be unwieldy and inconvenient. Such is the case in many applications where content only uses a portion of the screen and user interface portions (e.g., toolbars, status bars, scroll bars, rulers). As such, there are situations where providing ways to receive user input is unwieldy or awkward.

There is, therefore, a need in the art for improved systems and methods for using facial cues as computing commands.

SUMMARY OF THE CLAIMED INVENTION

Embodiments of the present invention include systems and methods of using facial cues as computing commands. Information regarding facial cues may be received. Such information may associated each facial cue with a responsive action. Images (e.g., photo, video) of an area in front of a computing device may be captured by a front-facing camera. A user's face may be detected, as well as determined to exhibit a facial cue. For example, the camera may be used to track movement of the user's eyes as they relate to the computing device display. The facial cue is identified, along with its associated action. The computing device may then perform the action associated with the facial cue exhibited by the user. For example, when the eyes of the user move up the computing device display screen, the screen may scroll up; when eye movements head down the display screen, the screen may scroll down.

Various embodiments of the present invention include methods of using facial cues as computing commands. Such methods may include storing information in memory regarding one or more predetermined facial cues, each associated with an action. Methods may further include capturing images regarding an area in front of a computing device using a front-facing camera and executing instructions to detect when a face of a user appears within a predetermined distance from the front of the computing device, determine that the face of the user exhibits a facial cue, identify the action associated with the facial cue exhibited by the face of the user, and perform the action associated with the exhibited facial cue.

Embodiments of the present invention may further include systems of using facial cues as computing commands. Such systems may include memory for storing information regarding facial cues and their associations with an action, a front-facing camera to capture images regarding an area in front of a computing device, and a processor to execute instructions to detect when a face of a user appears within a predetermined distance from the front of the computing device, determine that the face of the user exhibits a facial cue, identify the action associated with the facial cue exhibited by the face of the user, and perform the action associated with the exhibited facial cue.

Other embodiments of the present invention include non-transitory computer-readable storage media on which is embodied instructions executable to perform a method of using facial cues as computing commands previously set forth above.

DETAILED DESCRIPTION

Use of facial cues as computing commands is provided. Information regarding facial cues may be received. Such information may associated each facial cue with a responsive action. Images (e.g., photo, video) of an area in front of a computing device may be captured by a front-facing camera. A user's face may be detected, as well as determined to exhibit a facial cue. The facial cue is identified, along with its associated action. The computing device may then perform the action associated with the facial cue exhibited by the user.

Figure 1:
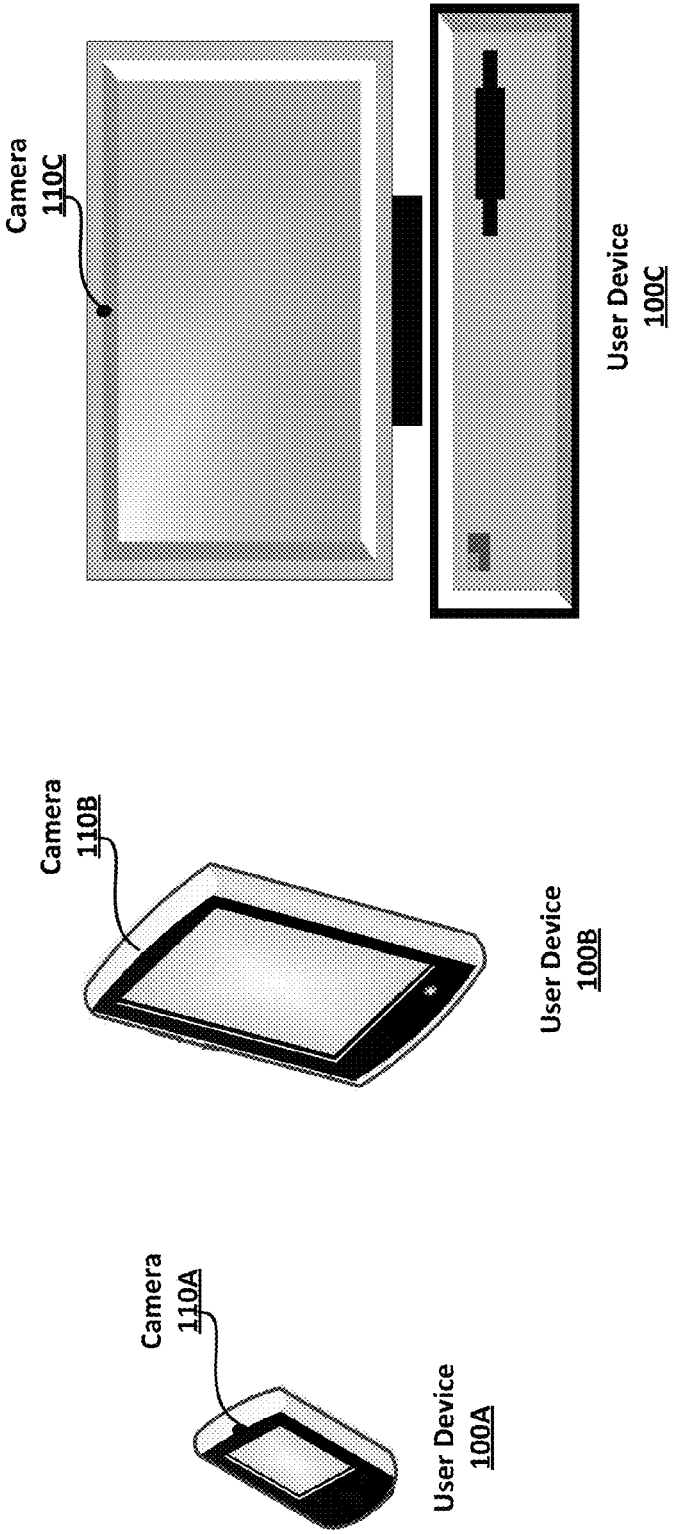
FIG. 1 illustrates a network environment in which an exemplary system of using facial cues as computing commands may be implemented.

FIG. 1 illustrates several embodiments of user devices 100A-C upon which a system for using facial cues as computing commands may be implemented. Any number of different electronic user devices 100A-C may include general purpose computers, mobile phones, smartphones, personal digital assistants (PDAs), portable computing devices (e.g., laptop, netbook, tablets), desktop computing devices, handheld computing device, or any other type of computing device known in the art for providing computing displays to a user. User devices 100 may also be configured to access data from other storage media, such as memory cards or disk drives as may be appropriate in the case of downloaded services. User devices 100 may include standard hardware computing components such as network and media interfaces, non-transitory computer-readable storage (memory), and processors for executing instructions that may be stored in memory.

User device 100A is illustrated as a mobile phone or smartphone, while user device 100B is illustrated as a tablet computing device and user device 100C is illustrated as a desktop device. As can be seen, each user device 100 is sized differently and/or has different input options.

Each user device 100A-C has a front-facing camera 110A-C for capturing images, photographic or video, of an area in front of the user device 100A-C. Depending on the type of user device 100, the front-facing camera 110 may further be associated with a variety of software applications for facial recognition, lip-reading, tracking eye movement, and other means known in the art for interpreting facial cues. It is contemplated that a means for to enabling/disabling the functionality disclosed herein may be provided. Such means may include a physical key, gesture, or some other form of input.

Figure 2:
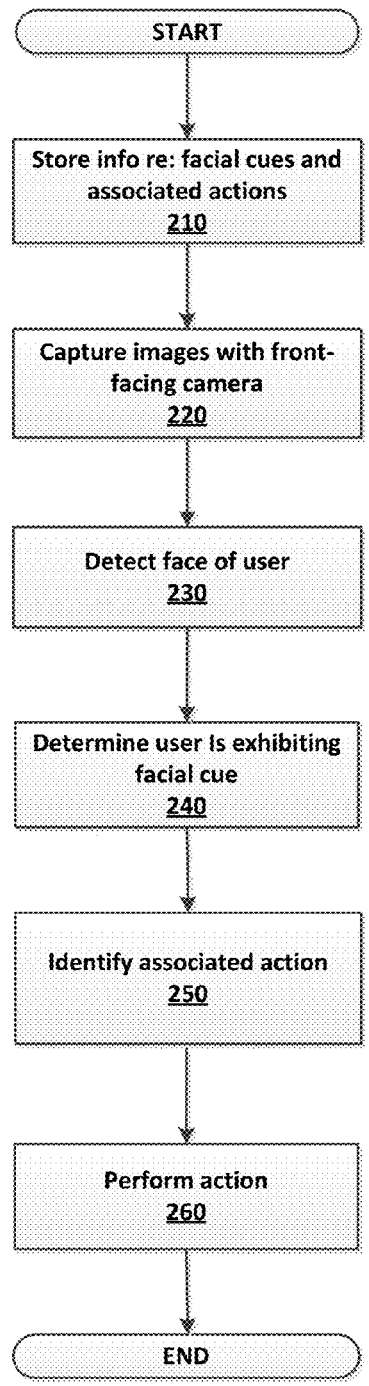
FIG. 2 is a flowchart illustrating an exemplary method of using facial cues as computing commands.

FIG. 2 illustrates a method 200 for using facial cues as computing commands. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, information is stored in memory regarding facial cues and associated actions, images are capture using a front-facing camera of a computing device, a user's face is detected in front of the computing device and determined to exhibit a facial cue, an associated action is identified, and the action is performed by the computing device.

Figure 3:
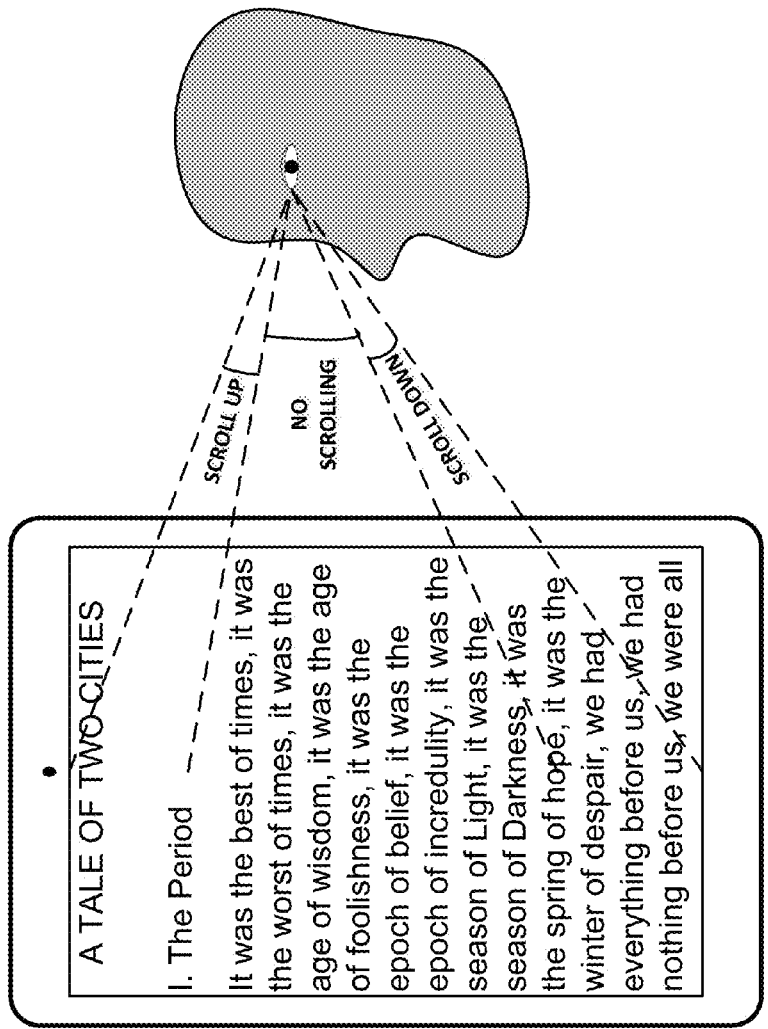
FIG. 3 illustrates an exemplary implementation of a method of using facial uses as computing commands.

In step 210, information regarding facial cues is stored in memory. Each facial cue may be associated with a type of action involving the computing device. For example, eye movements may be associated with scrolling. FIG. 3 illustrates an exemplary user device 100 and a face of a user. In the illustrated embodiment, certain ranges of lines-of-sight may be associated with different types of scrolling. For lines-of-sight that are directed toward the top portion of the user device 100, the associated action may be scrolling up. Likewise, for lines-of-sight directed toward the bottom portion of the user device 100, the associated action may be scrolling down. Lines-of-sight directed toward the center portion of the user device 100 may be associated with no scrolling. While the foregoing describes up-and-down scrolling, similar principles may be applicable to side-to-side scrolling.

The stored information may pertain to a variety of facial cues. In addition to eye movement, facial cues may additionally include facial expressions, nodding, shaking head, blinking, winking, and any other facial or head movements that may be detected via the front-facing camera 110. Each facial cue may be associated with one or more of a variety of computing commands. In addition to scrolling, facial cues may be associated with various types of input (e.g., answering yes or no pop-up windows), clicking through sequential pages or slides, and any other computing command known in the art for controlling the user device 100.

The association between facial cues and commands may be set by default and/or may be customized. For example, the size and location of the portions related to line-of-sight in FIG. 3 may be adjusted by the user. Similarly, the user may choose a particular facial expression and designated a particular command to be performed when the selected facial expression is detected. The user may also update the stored information regarding facial cues, for example, as the user ages or incurs other facial changes.

In step 220, one or more images are captured via a front-facing camera 110. A front-facing camera 110 can capture photographic or video images of an area in front of a user device 100 screen. While such front-facing cameras 110 generally require activation before images are captured, embodiments of the present invention may program the front-facing camera 110 to be activated via motion, intermittently, or other detectable input. For example, the front-facing camera 110 may capture images intermittently at predetermined intervals. In some embodiments, such predetermined intervals may be adjusted based on evaluation of the captured images. Alternatively, the front-facing camera 110 may be activated via user input (e.g., touching a touchscreen, pressing a button, audible commands). In such cases, the front-facing camera 110 may communicate and operate in conjunction with a touchscreen, buttons, microphones, accelerometers, and other components for receiving an indication related to activation of the front-facing camera 110.

In step 230, a face of a user may be detected in the captured images. Detection of a face may include applying facial recognition or other technologies known in the art for identifying user faces to the images captured in the previous step. In some embodiments, detection of a face additionally includes recognition of a specific face (e.g., belonging a particular user). Detection of a face may therefore further include identifying the relative locations of eyes, nose, mouth, and other facial features.

In step 240, it is determined that the face is exhibiting a particular facial cue. The images captured may additionally be subjected to algorithms and automated processes for determining specific facial expressions, movements, or other types of cues. For example, images taken at one moment may be compared to images from a subsequent moment. The comparison may reveal direction of a moving gaze or detect another type of facial movement. In some embodiments, the information regarding facial cues stored in memory may be used to search the images for similar facial cues.

In step 250, an action associated with the exhibited facial cue is identified. Once it is determined that the face is exhibiting a particular facial cue, the stored information regarding facial cues may be accessed to identify what actions (e.g., commands regarding actions) are associated with the exhibited facial cue. In step 260, the identified action is performed by the user device 100.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for using facial cues, the method comprising:
   storing information in memory regarding one or more predetermined facial cues, wherein each facial cue is associated with an action;
   capturing images regarding an area in front of a computing device having a display screen and a front-facing camera;
   executing instructions stored in memory, wherein execution of the instructions by a processor:
   detects when a face of a user appears within a predetermined distance from the front of the computing device,
   determines that the face of the user exhibits a facial cue, wherein the facial cue comprises a line-of-sight from eyes of the user directed toward a defined portion of the display screen, wherein a size or a location of the defined portion is defined and adjustable by the user,
   identifies the action associated with the line-of-sight facial cue exhibited by the face of the user and with the associated defined portion of the display screen, and
   performs the identified action associated with the exhibited line-of-sight facial cue and the defined portion of the display screen.

2. The method of claim 1, wherein the action associated with the line-of-sight to the portion of the display screen is scrolling towards the portion.

3. The method of claim 2, wherein the scrolling comprises vertical scrolling.

4. The method of claim 2, wherein the scrolling comprises horizontal scrolling.

5. The method of claim 1, further comprising defining a plurality of different portions of the display screen.

6. The method of claim 5, further comprising receiving adjustment input from the user, wherein the size or the location of the portion is adjusted in accordance with the adjustment input from the user.

7. The method of claim 5, wherein lines-of-sight to each portion are associated with a different specified scrolling action.

8. The method of claim 1, wherein determining that the face of the user exhibits a facial cue comprises tracking eye movement and line-of-sight.

9. A system for using facial cues, the system comprising:
   memory that stores information regarding one or more predetermined facial cues, wherein each facial cue is associated with an action;
   a display screen having a plurality of defined portions, wherein a size or a location of at least one of the defined portions is defined and adjustable by the user;
   a front-facing camera that captures images regarding an area in front of a computing device;
   a processor that executes instructions stored in memory, wherein execution of the instructions:
   detects when a face of a user appears within a predetermined distance from the front of the computing device,
   determines that the face of the user exhibits a facial cue, wherein the facial cue comprises a line-of-sight from eyes of the user directed toward one of the defined portions in the display screen,
   identifies the action associated with the line-of-sight facial cue exhibited by the face of the user and with the associated defined portion of the display screen, and
   performs the identified action associated with the exhibited line-of-sight facial cue and the associated defined portion of the display screen.

10. The system of claim 9, wherein the action associated with the line-of-sight to the portion of the display screen is scrolling towards the portion.

11. The system of claim 10, wherein the scrolling comprises vertical scrolling.

12. The system of claim 10, wherein the scrolling comprises horizontal scrolling.

13. The system of claim 9, further comprising defining a plurality of different portions of the display screen based on user input.

14. The system of claim 13, further comprising a user interface that receives adjustment input from the user, wherein the size or the location of one of the portions is adjusted in accordance with the adjustment input from the user.

15. The system of claim 13, wherein lines-of-sight to each portion are associated with a different specified scrolling action.

16. The system of claim 9, wherein determining that the face of the user exhibits a facial cue comprises tracking eye movement and line-of-sight.

17. A non-transitory computer-readable storage medium, having embodied thereon a program executable by a processor to perform a method for using facial cues, the method comprising:
   storing information regarding one or more predetermined facial cues, wherein each facial cue is associated with an action;
   capturing images regarding an area in front of a computing device having a display screen and a front-facing camera;
   detecting when a face of a user appears within a predetermined distance from the front of the computing device;
   determining that the face of the user exhibits a facial cue, wherein the facial cue comprises a line-of-sight from eyes of the user directed toward a defined portion of the display screen, wherein a size or a location of the defined portion is defined and adjustable by the user;
   identifying the action associated with the line-of-sight facial cue exhibited by the face of the user and with the associated defined portion of the display screen; and
   performing the identified action associated with the exhibited line-of-sight facial cue and with the associated defined portion of the display screen.

18. The method of claim 1, wherein the action associated with the line-of-sight facial cue is designated by the user.

19. The system of claim 9, wherein the action associated with the line-of-sight facial cue is designated by the user.

20. The non-transitory computer-readable storage medium of claim 17, wherein the action associated with the line-of-sight facial cue is designated by the user.

\* \* \* \* \*